Dec. 17, 1929.  E. P. KIRKEVOLD  1,739,905
PRESERVING JAR
Filed Feb. 20, 1929
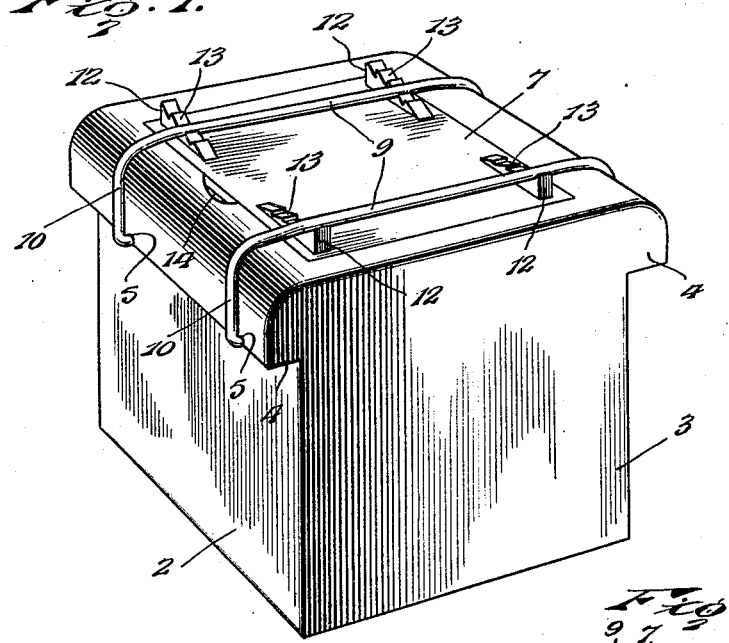
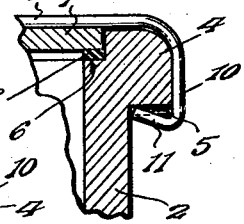
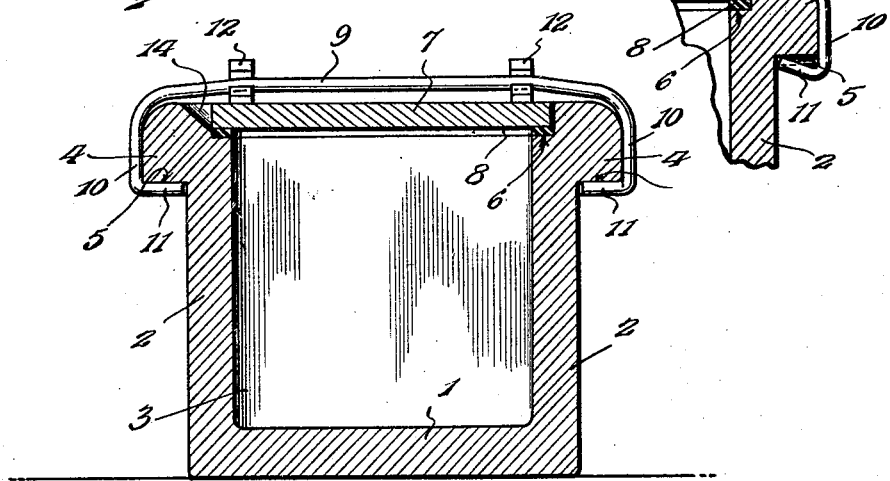
Inventor
*Emma P. Kirkevold.*
By *Lacey & Lacey,*
Attorneys Patented Dec. 17, 1929

1,739,905

UNITED STATES PATENT OFFICE

EMMA P. KIRKEVOLD, OF BROOKINGS COUNTY, SOUTH DAKOTA

PRESERVING JAR

Application filed February 20, 1929. Serial No. 341,483.

This invention relates to receptacles and more particularly to a preserving jar in which meat or other food products may be stored in a partially or entirely cooked state and stored away for future use.

One object of the invention is to provide a jar of this character having a large mouth at its upper end and of a size not less than the interior of the jar thereby allowing large pieces of meat or the like to be easily placed in the jar or removed therefrom.

Another object of the invention is to so form the jar that a number of jars may be placed side by side in close contacting engagement with each other and further to provide opposed sides of the jar with outstanding shoulders which allow a large jar to be easily lifted when filled and also constitute shoulders beneath which securing elements for a lid or cover may be engaged.

Another object of the invention is to so form the securing elements or yokes that they may have firm engagement with the shoulders of the jaw when applied thereto with portions extending across the lid and further to provide wedges adapted to be forced between the yokes and lid and so formed that when they are forced into place the wedges will not be liable to slip out of place and remove desired pressure from the lid.

The invention is illustrated in the accompanying drawing, wherein

Figure 1 is a perspective view of the improved jar,

Fig. 2 is a vertical sectional view through the jar, and

Fig. 3 is a fragmentary sectional view showing the position occupied by one of the yokes before wedges are applied.

The improved jar includes a body portion or receptacle which is preferably formed of earthenware so that it may be subjected to heat without being liable to crack and thereby allow meat or the like to be cooked in the jar and the jar closed. This eliminates the necessity of cooking the meat in another vessel and placing it in jars after being cooked. The jar or receptacle is substantially rectangular in shape and is formed with a bottom 1 and upstanding walls 2 and 3. The bottom and walls may be of any thickness desired or found necessary according to the size of the jar. The outer surfaces of the walls 3 are flat and unobstructed throughout their areas, as shown in Fig. 1, but the walls 2 have their upper portions formed with shoulders 4 which project outwardly and have their under surfaces formed with notches or recesses 5 constituting seats, the purpose of which will be hereinafter set forth. The inner surfaces of the walls are smooth and unobstructed for practically the entire depth of the jar but at the open upper end of the jar the walls are recessed to form a ledge 6 which extends entirely about the mouth of the jar and constitutes a support for the lid or cover 7. This lid or cover fits snugly in the open mouth or upper end of the jar and a gasket 8 of rubber is applied upon the ledge so that when the lid is pressed downwardly the gasket will be compressed and an air-tight closure formed.

In order to secure the lid or cover, there has been provided yokes 9 formed of resilient wire. The yokes extend across the lid and shoulders and at their ends are formed with depending arms 10 which terminate in inwardly extending fingers 11 of sufficient length to engage beneath the shoulders. These fingers which are to be engaged in the seats 5 to prevent the yokes from slipping longitudinally of the shoulders are so bent with respect to the arms 10 that they initially extend at an upward incline, as shown in Fig. 3, but when the arms are drawn upwardly by the action of wedges 12 forced between the lid and yokes, as shown in Figs. 1 and 2, the fingers will assume a horizontal position and fit snugly in the seats. The wedges may be formed of metal, wood or any other suitable material and have sloping upper surfaces provided with teeth 13 over which the yokes move as the wedges are forced into place. By having the wedges formed with the teeth they will have firm engagement with the yokes and will be prevented from slipping out of place.

When the improved jar is in use, meat is placed in a jar and the jar placed in an oven. After the meat has been sufficiently cooked to preserve it, the jar is removed and the lid applied after a gasket has been set in place. The yokes are slipped into position and the wedges forced into place and exert downward pressure upon the lid so that the gasket is compressed and an air-tight closure formed. As the jars are sealed before the meat has cooled, a partial vacuum will be formed in the jars and in view of the fact that the meat is not cooked in a separate receptacle and then transferred to the jars all of its essence and strength will be retained. When it is desired to use the meat, an ice pick or other suitable prying implement is applied beneath the yokes in order to spring them upwardly a sufficient distance to allow the wedges to be withdrawn and the yokes can then be removed and the lid lifted out of place by inserting an ice pick or similar prying tool into the notch 14 with its end engaging under the lid and then prying the lid upwardly. I have, therefore, provided a jar in which meat or other food products may be cooked and stored until they are to be used and have further provided a jar so constructed that it may be easily lifted by grasping it beneath the shoulders. It will be further noted that since the walls 3 have flat and unobstructed outer surfaces a number of jars may be placed side by side in close contacting engagement with each other.

Having thus described the invention, I claim:

1. A preserving jar comprising a body open at its top and having an internal ledge adjacent its top, the body having opposed walls formed with outwardly extending shoulders across their upper ends and other walls having their outer surfaces flat and unobstructed throughout their entire areas, said shoulders having their under surfaces formed with seats spaced from their ends, a lid fitting into said body and supported by said ledge and having a flat upper surface, resilient yokes extending across the lid and shoulders and having depending arms terminating in fingers extending under the shoulders and engaged in said seats, and wedges forced between the yokes and lid to press the lid downwardly and tightly close the body.

2. A preserving jar comprising a body open at its top and having a bottom and opposed walls extending upwardly therefrom and having their upper ends recessed to form a circumferentially extending internal ledge, shoulders projecting outwardly from the upper ends of certain of the opposed walls and having their under faces notched in spaced relation to their ends to form seats, a gasket fitted into said body and seated upon said ledge, a lid resting upon said gasket and having a flat upper surface, yokes of resilient wire extending across the lid and shoulders and having depending arms terminating in fingers extending inwardly beneath the shoulders and engaged in said seats, and wedges forced between the lid and yokes to press the lid downwardly upon the gasket and having sloping upper surfaces formed with teeth to engage the yokes and prevent the wedges from slipping out of place.

In testimony whereof I affix my signature.

EMMA P. KIRKEVOLD. [L. S.]